(12) United States Patent
Otsuka et al.

(10) Patent No.: US 11,634,178 B2
(45) Date of Patent: Apr. 25, 2023

(54) FRONT PILLAR OUTER

(71) Applicant: NIPPON STEEL CORPORATION, Tokyo (JP)

(72) Inventors: Kenichiro Otsuka, Tokyo (JP); Masafumi Azuma, Tokyo (JP); Naoki Kimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/626,958

(22) PCT Filed: Jul. 14, 2020

(86) PCT No.: PCT/JP2020/027373
§ 371 (c)(1),
(2) Date: Jan. 13, 2022

(87) PCT Pub. No.: WO2021/010395
PCT Pub. Date: Jan. 21, 2021

(65) Prior Publication Data
US 2022/0315120 A1    Oct. 6, 2022

(30) Foreign Application Priority Data

Jul. 16, 2019    (JP) .............................. JP2019-131351

(51) Int. Cl.
*B62D 25/04*    (2006.01)
*B62D 27/02*    (2006.01)

(52) U.S. Cl.
CPC ........... *B62D 25/04* (2013.01); *B62D 27/023* (2013.01); *B62D 27/026* (2013.01)

(58) Field of Classification Search
CPC ............................. B62D 25/04; B62D 27/023
USPC ....................................... 296/193.06, 29, 30
See application file for complete search history.

(56) References Cited

U.S. PATENT DOCUMENTS

| | | |
|---|---|---|
| 4,699,419 A | 10/1987 | Kawase et al. |
| 7,344,186 B1 | 3/2008 | Hausler et al. |
| 2017/0106917 A1 | 4/2017 | Mashio et al. |

FOREIGN PATENT DOCUMENTS

| | | |
|---|---|---|
| JP | 5-310147 A | 11/1993 |
| JP | 2014-118009 A | 6/2014 |
| JP | 2016-2781 A | 1/2016 |

*Primary Examiner* — Dennis H Pedder
(74) *Attorney, Agent, or Firm* — Birch, Stewart, Kolasch & Birch, LLP

(57) ABSTRACT

An objective of the present invention is to provide a front pillar outer that has high strength and high rigidity. In an area in which the first door-side flange part and a second door-side flange part overlap with each other, the first door-side flange part and the second door-side flange part are joined to each other. In an area in which the first glass-face-side flange part and the second glass-face-side flange part overlap with each other, the first glass-face-side flange part and the second glass-face-side flange part are joined to each other.

5 Claims, 9 Drawing Sheets

FRONT PILLAR OUTER

TECHNICAL FIELD

The present invention relates to a front pillar outer that forms a front pillar.

BACKGROUND ART

A vehicle body of an automobile includes a front pillar. The front pillar is formed by a combination of a front pillar inner, a front pillar outer and the like. From the viewpoint of improving the collision safety of the automobile, the front pillar desirably has high strength. From the viewpoint of improving the traveling stability, the front pillar desirably has high rigidity. Therefore, there is a demand for improving the strength and rigidity of the front pillar.

Vehicle body components improved in strength are described in Japanese Patent Application Publication No. 2014-118009 (Patent Literature 1), Japanese Patent Application Publication No. 5-310147 (Patent Literature 2), and Japanese Patent Application Publication No. 2016-2781 (Patent Literature 3), for example.

In Patent Literature 1, a front pillar lower provided with a reinforcement component is described. The reinforcement component described in Patent Literature 1 includes a vertical face part opposed to a front wheel and a horizontal face part having high strength. When a head-on collision of the vehicle occurs, the front wheel moves toward the rear of the vehicle. The vertical face part limits the movement of the front wheel toward the rear of the vehicle. The horizontal face part absorbs the collision energy applied to the vertical face part. In Patent Literature 1, it is disclosed that the deformation of the front pillar lower caused by the collision can be reduced in this way.

The vehicle body component disclosed in Patent Literature 2 has a first structure that has a closed cross section, and a second structure that has a closed cross section and is welded to the first structure. Therefore, the vehicle body component includes a portion formed by only the first structure and a portion formed by the first structure and the second structure. In short, the vehicle body component includes two portions having different plate thicknesses. In Patent Literature 2, it is disclosed that the collision energy absorption capacity of the vehicle body component is improved in this way.

The vehicle body component disclosed in Patent Literature 3 has a first component having a U-shape, and a second component having a U-shape. A slit is formed in each of an end part of the first component and an end part of the second component. With the slit of the first component being arranged to overlap with the slit of the second component, the first component and the second component are welded to each other. In other words, in a part of the vehicle body component, the two components overlap with each other, and therefore, the strength is increased. In Patent Literature 3, it is disclosed that the vehicle body component has high strength even if the vehicle body component is not provided with a reinforcement plate or the like as a separate member.

In other techniques for improving strength and rigidity than Patent Literatures 1 to 3, a tailored welded blank (referred to also as TWB, hereinafter) or a tailored rolled blank (referred to also as TRB, hereinafter) can be used as the material of the front pillar. Alternatively, a reinforcement plate can also be attached to a part of the front pillar.

TWB is a material formed by a plurality of metal plates that are different in material or plate thickness and combined by welding. A component made of TWB partially has one or both of variations in plate thickness and variations in strength. TRB is a metal plate that is formed by special rolling and has a continuously varying plate thickness. A component made of TRB partially has one or both of variations in plate thickness and variations in strength.

CITATION LIST

Patent Literature

Patent Literature 1: Japanese Patent Application Publication No. 2014-118009
Patent Literature 2: Japanese Patent Application Publication No. 5-310147
Patent Literature 3: Japanese Patent Application Publication No. 2016-2781

SUMMARY OF INVENTION

Technical Problem

However, it is hard to say that the prior-art techniques described above can sufficiently improve the strength of the front pillar outer, which contributes to the collision resistance, and the rigidity of the front pillar outer, which contributes to the traveling stability.

An objective of the present invention is to provide a front pillar outer that has high strength and high rigidity.

Solution to Problem

A front pillar outer according to an embodiment of the present invention includes a glass-face-side flange part, a door-side flange part, and a main body part that connects the glass-face-side flange part and the door-side flange part to each other. The front pillar outer has a first member and a second member. The plate thickness of the second member is equal to or greater than the plate thickness of the first member.

The first member extends in a longitudinal direction from a fore end toward a rear end of the front pillar outer. The first member includes a first glass-face-side flange part, a first door-side flange part, and a first main body part that connects the first glass-face-side flange part and the first door-side flange part to each other. The first glass-face-side flange part forms a part of the glass-face-side flange part. The first door-side flange part forms a part of the door-side flange part. The first main body part forms a part of the main body part.

The second member extends in the longitudinal direction from the rear end toward the fore end of the front pillar outer. The second member includes a second glass-face-side flange part, a second door-side flange part, and a second main body part that connects the second glass-face-side flange part and the second door-side flange part to each other. The second glass-face-side flange part forms a part of the glass-face-side flange part. The second door-side flange part forms a part of the door-side flange part. The second main body part forms a part of the main body part.

A rear end of the first door-side flange part is located more rearward than a rear end of the first glass-face-side flange part and a rear end of the first main body part. A fore end of the second glass-face-side flange part is located more forward than a fore end of the second door-side flange part and a fore end of the second main body part. The first door-side flange part and the second door-side flange part overlap with each other in an area from the rear end of the first door-side flange part to the fore end of the second door-side flange part. The first glass-face-side flange part and the second glass-face-side flange part overlap with each other in an area from the rear end of the first glass-face-side flange part to the fore end of the second glass-face-side flange part. The first main body part and the second main body part overlap with each other in an area from the rear end of the first main body part to the fore end of the second main body part.

The first member and the second member are joined to each other in the area in which the first door-side flange part and the second door-side flange part overlap with each other, the area in which the first glass-face-side flange part and the second glass-face-side flange part overlap with each other, and the area in which the first main body part and the second main body part overlap with each other.

Advantageous Effects of Invention

The front pillar outer according to the embodiment of the present invention has high strength and high rigidity.

DESCRIPTION OF EMBODIMENT

Figure 1:
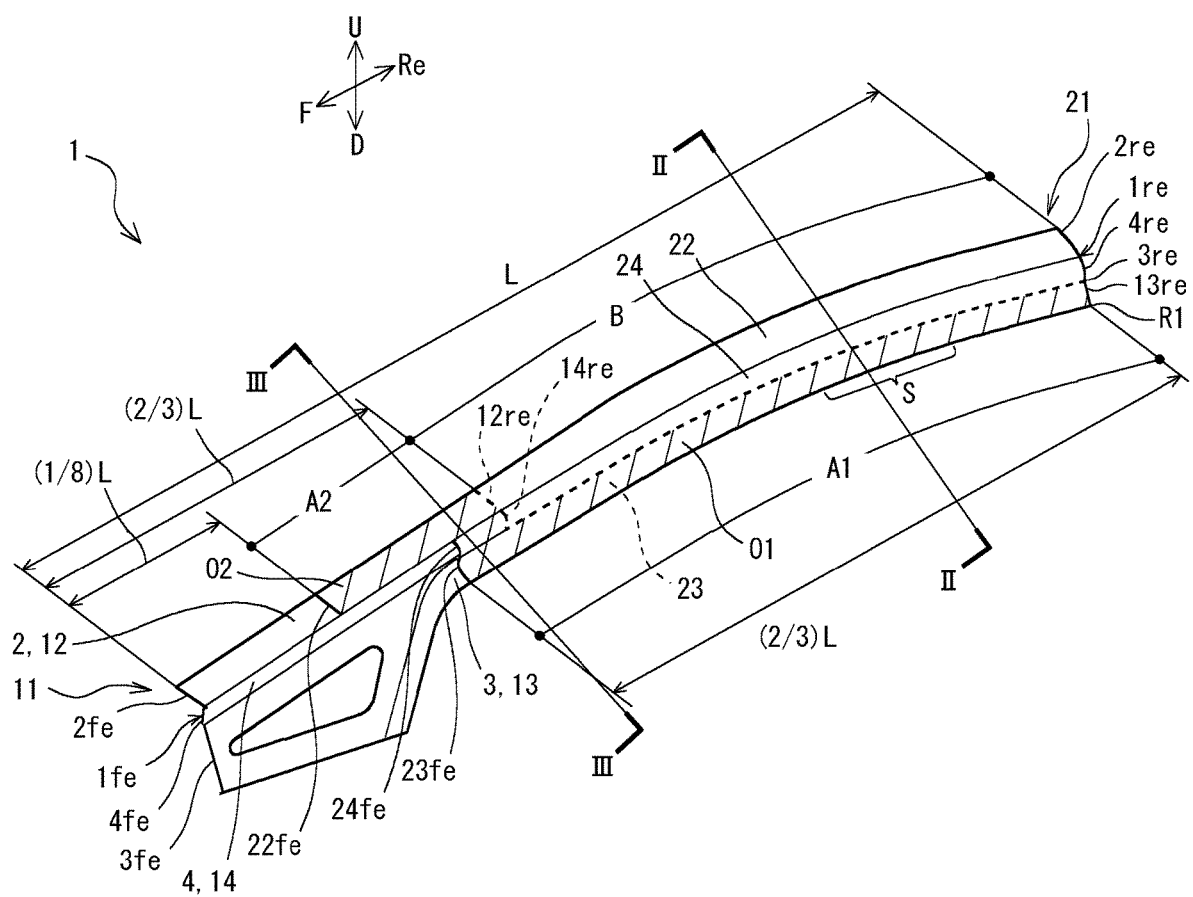
FIG. 1 is a perspective view of an example of a front pillar outer according to an embodiment.

In the following, an embodiment of the present invention will be described. Although examples of the embodiment of the present invention will be described below, the present invention is not limited to the examples described below. Although particular numerical values or particular materials may be referred to as examples in the following description, the present invention is not limited to such examples.

A front pillar outer according to this embodiment includes a glass-face-side flange part, a door-side flange part, and a main body part that connects the glass-face-side flange part and the door-side flange part to each other. The front pillar outer has a first member and a second member. The plate thickness of the second member is equal to or greater than the plate thickness of the first member.

The first member extends in a longitudinal direction from a fore end toward a rear end of the front pillar outer. The first member includes a first glass-face-side flange part, a first door-side flange part, and a first main body part that connects the first glass-face-side flange part and the first door-side flange part to each other. The first glass-face-side flange part forms a part of the glass-face-side flange part. The first door-side flange part forms a part of the door-side flange part. The first main body part forms a part of the main body part.

The second member extends in the longitudinal direction from the rear end toward the fore end of the front pillar outer. The second member includes a second glass-face-side flange part, a second door-side flange part, and a second main body part that connects the second glass-face-side flange part and the second door-side flange part to each other. The second glass-face-side flange part forms a part of the glass-face-side flange part. The second door-side flange part forms a part of the door-side flange part. The second main body part forms a part of the main body part.

A rear end of the first door-side flange part is located more rearward than a rear end of the first glass-face-side flange part and a rear end of the first main body part. A fore end of the second glass-face-side flange part is located more forward than a fore end of the second door-side flange part and a fore end of the second main body part. The first door-side flange part and the second door-side flange part overlap with each other in an area from the rear end of the first door-side flange part to the fore end of the second door-side flange part. The first glass-face-side flange part and the second glass-face-side flange part overlap with each other in an area from the rear end of the first glass-face-side flange part to the fore end of the second glass-face-side flange part. The first main body part and the second main body part overlap with each other in an area from the rear end of the first main body part to the fore end of the second main body part.

The first member and the second member are joined to each other in the area in which the first door-side flange part and the second door-side flange part overlap with each other, the area in which the first glass-face-side flange part and the second glass-face-side flange part overlap with each other, and the area in which the first main body part and the second main body part overlap with each other.

As described above, with the front pillar outer according to this embodiment, the first door-side flange part and the second door-side flange part are joined to each other in the overlapping area thereof. Furthermore, the first glass-face-side flange part and the second glass-face-side flange part are joined to each other in the overlapping area thereof. In this way, the first member and the second member that overlap with each other are integrated with each other, thereby forming the front pillar outer. In other words, the front pillar outer according to this embodiment is formed by the first member and the second member.

When a collision load is applied to the front pillar outer according to this embodiment, the front pillar outer is curved. As a result, a compressive strain is exerted on a partial area of the door-side flange part along the longitudinal direction. In this specification, the area on which the compressive strain is exerted is referred to also as a "door-side compressive region". On the other hand, a tensile strain is exerted on a partial area of the glass-face-side flange part along the longitudinal direction. In this specification, the area on which the tensile strain is exerted is referred to also as a "glass-face-side tensile region". Furthermore, a compressive strain is exerted on another partial area of the glass-face-side flange part along the longitudinal direction. In this specification, the area on which the compressive strain is exerted is referred to also as a "glass-face-side compressive region". The door-side compressive region and the glass-face-side compressive region are generically referred to also as a compressive strain region. The glassface-side tensile region is generically referred to also as a "tensile strain region". In a collision, the compressive strain region is likely to buckle.

With the front pillar outer according to this embodiment, in the door-side compressive region, the first door-side flange part and the second door-side flange part overlap with each other. In this overlapping area, the first door-side flange part and the second door-side flange part are joined to each other. Furthermore, in the glass-face-side compressive region, the first glass-face-side flange part and the second glass-face-side flange part overlap with each other. In this overlapping area, the first glass-face-side flange part and the second glass-face-side flange part are joined to each other. In short, in both the door-side compressive region and the glass-face-side compressive region, two layers of material are stacked on one another.

Here, the collision resistance of the compressive strain region is approximately proportional to the product of the strength of the material and the third power of the plate thickness of the material. Therefore, increasing the plate thickness of the material of the compressive strain region greatly contributes to the improvement of the collision resistance. Specifically, the collision resistance is buckling strength. With the front pillar outer according to this embodiment, in the compressive strain regions (the door-side compressive region and the glass-face-side compressive region), two layers of material are stacked on one another, and the plate thickness is substantially increased. Therefore, the buckling strength of the compressive strain region is significantly improved. In this way, the strength of the front pillar outer can be increased.

With the front pillar outer according to this embodiment, the glass-face-side tensile region is formed by only the second member, that is, a single layer of a single material. Here, the collision resistance of the tensile strain region is proportional to the product of the strength of the material and the plate thickness of the material. Therefore, increasing the plate thickness of the material of the tensile strain region makes a smaller contribution to the improvement of the collision resistance than increasing the plate thickness of the material of the compressive strain region. In order to improve the collision resistance of the tensile strain region, the strength of the material can be increased. If the strength of the material is increased, the collision resistance of the compressive strain region is further improved. With the front pillar outer according to this embodiment, the plate thickness of the tensile strain region does not increase. Therefore, an increase of the weight can be reduced, and the weight of the front pillar outer can be reduced by increasing the strength of the material.

However, while the vehicle is traveling, a compressive stress and a tensile stress repeatedly occur in the glass-face-side tensile region of the front pillar outer. If the rigidity of the glass-face-side tensile region is low, the traveling stability is compromised. Therefore, the rigidity of the glass-face-side tensile region needs to be increased.

With the front pillar outer according to this embodiment, although the glass-face-side tensile region is formed by only the second member, the plate thickness of the second member is not smaller than the plate thickness of the first member. In other words, the plate thickness of the second member is equal to or greater than the plate thickness of the first member. Therefore, the rigidity of the glass-face-side tensile region is improved. As a result, the traveling stability is increased.

Note that, while the vehicle is traveling, a repetitive stress similar to the stress occurring in the glass-face-side tensile region occurs in the door-side compressive region. With the front pillar outer according to this embodiment, as described above, in the glass-face-side compressive region, two layers of material are stacked on one another, and the plate thickness is substantially increased. Therefore, in the glass-face-side compressive region, not only the buckling strength but also the rigidity is significantly improved. As a result, the traveling stability is further increased.

The order of stacking of the first member and the second member is not particularly limited. Specifically, the first member may be overlaid on the second member, or the second member may be overlaid on the first member.

In the front pillar outer according to this embodiment, provided that a length of the glass-face-side flange part is denoted by L, the area in which the first door-side flange part and the second door-side flange part overlap with each other is preferably provided in the door-side flange part over a part or the whole of a range between a position corresponding to a rear end of the glass-face-side flange part and a position at a distance of L×2/3 from the position corresponding to the rear end of the glass-face-side flange part.

In many cases, when a collision load is applied to the front pillar outer, a large compressive strain is likely to occur in the door-side flange part in the curved area close to the rear end of the front pillar outer. In other words, the door-side compressive region is likely to be disposed close to the rear end of the front pillar outer. Therefore, if the first door-side flange part and the second door-side flange part overlap with each other over a part or the whole of such a range, buckling of the front pillar outer can be further reduced.

In the front pillar outer according to this embodiment, provided that a length of the glass-face-side flange part is denoted by L, the area in which the first glass-face-side flange part and the second glass-face-side flange part overlap with each other is preferably provided over a part or the whole of a range between a position at a distance of L×1/8 from a fore end of the glass-face-side flange part and a position at a distance of L×2/3 from the fore end of the glass-face-side flange part.

When a collision load is applied to the front pillar outer, a large compressive strain is likely to occur in the glass-face-side flange part in the vicinity of the fore end of the front pillar outer. In other words, the glass-face-side compressive region is likely to be disposed close to the fore end of the front pillar outer. Therefore, if the first glass-face-side flange part and the second glass-face-side flange part overlap with each other over a part or the whole of such a range, buckling of the front pillar outer can be further reduced.

With the front pillar outer described above, the plate thickness of the first member and the second member is not particularly limited, as far as the plate thickness of the second member is not smaller than the plate thickness of the first member. Practically, the plate thickness is preferably 0.60 mm or more to 1.60 mm or less. The lower limit of the plate thickness is more preferably 0.85 mm. The upper limit of the plate thickness is more preferably 1.05 mm. The plate thickness of the second member may be equal to or greater than the plate thickness of the first member.

The tensile strength (the strength of the material) of the first member and the second member is preferably 800 MPa or more. The lower limit of the tensile strength is more preferably 1200 MPa. The tensile strength of the first member may be the same or different from the tensile strength of the second member. From the viewpoint of the traveling stability, that is, from the viewpoint of increasing the rigidity of the glass-face-side tensile region, the tensile strength of the second member is preferably higher than the tensile strength of the first member.

The method of joining the first door-side flange part and the second door-side flange part to each other in the overlapping area thereof is not particularly limited. Similarly, the method of joining the first glass-face-side flange part and the second glass-face-side flange part to each other in the overlapping area thereof is also not particularly limited. The joining method is welding, for example. The welding method may be laser welding or spot welding, for example. The joining method may be mechanical fastening or bonding using an adhesive, for example. Some of these joining methods can also be used in combination.

In this case, the front pillar outer is suitable as a front pillar outer for an automobile.

In this specification, each direction of the front pillar outer means a direction of the front pillar outer installed in an automobile. For example, "forward", "rearward", "left", "right", "upward", and "downward" directions agree with the respective directions of an automobile. In the drawings, symbols "F", "Re", "Le", "R", "U", and "D" mean forward, rearward, left, right, upward, and downward directions of an automobile. In this specification, unless otherwise specified, the term "longitudinal direction" means a direction from the fore end to the rear end of the front pillar outer. The term "cross section" means a cross section that is perpendicular to the longitudinal direction of the front pillar outer.

In the following, the embodiment of the present invention will be described in detail with reference to the drawings. In the drawings, the same or corresponding parts are denoted by the same reference numerals, and redundant descriptions thereof will be omitted.

[Overview of Front Pillar Outer 1]

Figure 2:
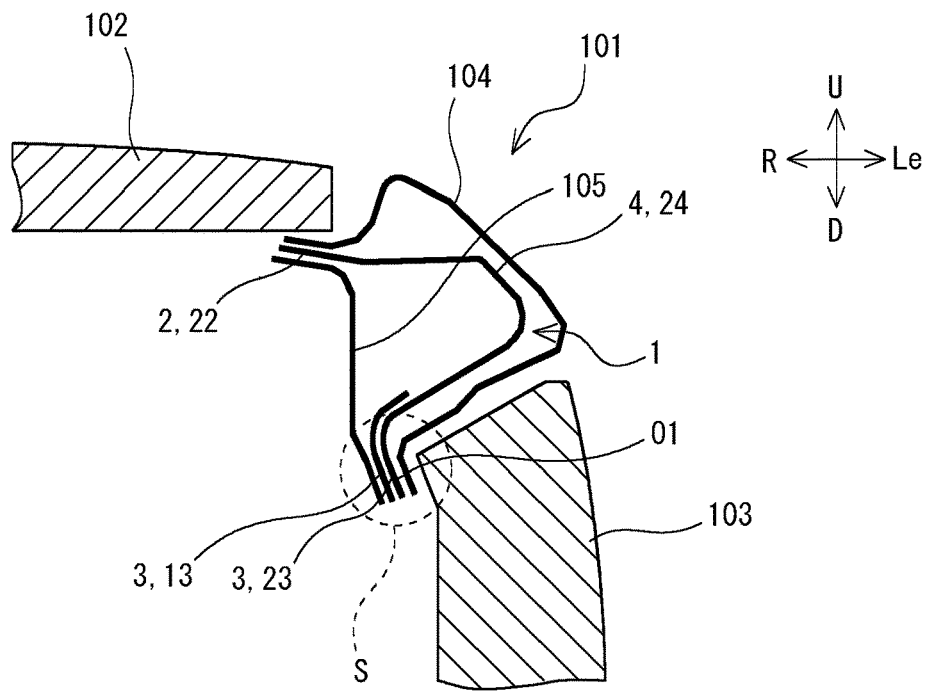
FIG. 2 is a cross-sectional view of a front pillar taken along a line II-II in FIG. 1.
Figure 3:
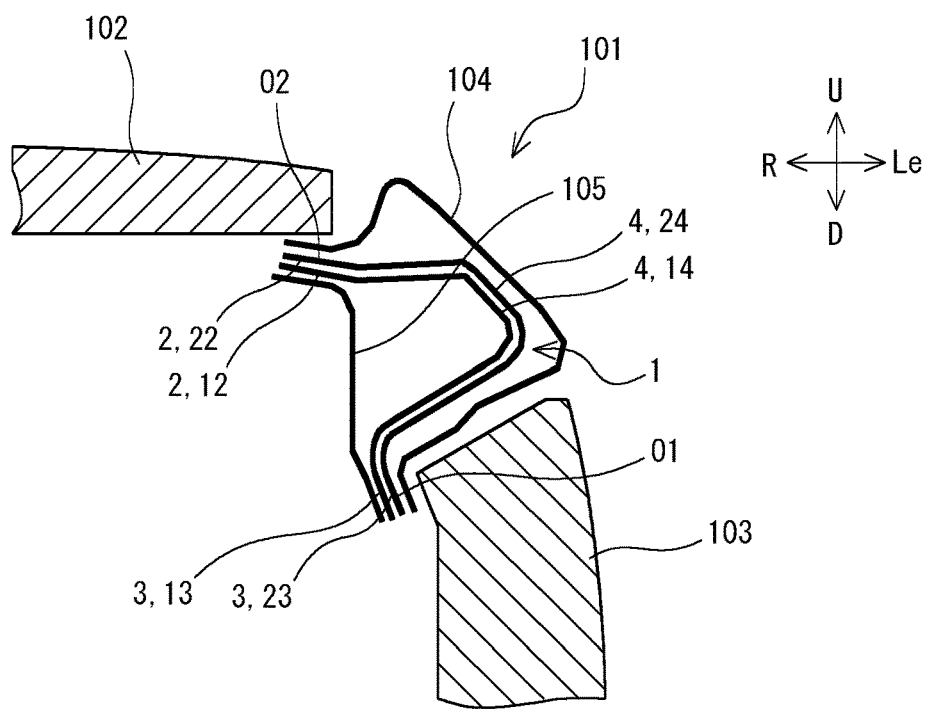
FIG. 3 is a cross-sectional view of the front pillar taken along a line III-III in FIG. 1.
Figure 4:
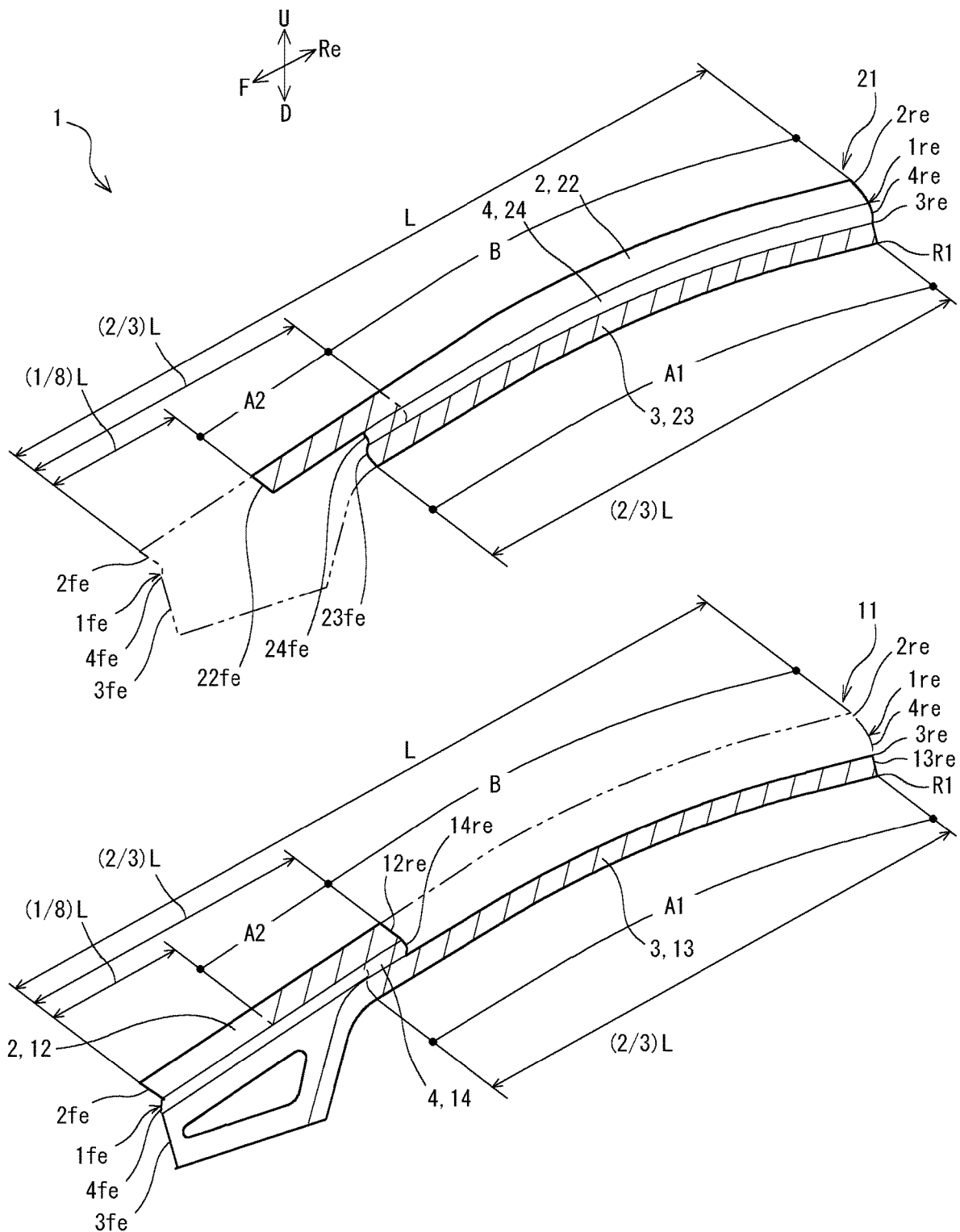
FIG. 4 is a perspective exploded view of the front pillar outer shown in FIG. 1.

FIG. 1 is a perspective view of an example of a front pillar outer 1 according to this embodiment. FIG. 2 is a cross-sectional view of a front pillar 101 taken along a line II-II in FIG. 1. FIG. 2 shows a cross section of a part of the front pillar outer 1 that is close to a rear end 1re thereof. The cross section shown in FIG. 2 includes a door-side compressive region A1. FIG. 3 is a cross-sectional view of the front pillar 101 taken along a line III-III in FIG. 1. FIG. 3 shows a cross section of a part of the front pillar outer 1 that is close to a fore end 1fe thereof. The cross section shown in FIG. 3 includes a glass-face-side compressive region A2 and the door-side compressive region A1. FIG. 4 is a perspective exploded view of the front pillar outer 1 shown in FIG. 1. The front pillar outer 1 shown in FIG. 1 to FIG. 4 is one of two front pillar outers of an automobile that is disposed on the left side of the automobile. Note that, in a first member 11 and a second member 21 in FIG. 4, the contour of the front pillar outer 1 is partially shown by an imaginary line (an alternate long and two short dashes line).

With reference to FIG. 2 and FIG. 3, the front pillar 101 supports a windshield 102. More strictly, the front pillar 101 referred to here is a front pillar upper forming a chassis of a vehicle body. The front pillar outer 1 is one of members forming the front pillar upper.

The front pillar 101 includes a side panel 104, a front pillar inner 105, and the front pillar outer 1. The side panel 104 is disposed on the outer side of the front pillar inner 105 and the front pillar outer 1. The side panel 104 and the front pillar inner 105 form a closed cross section. The front pillar outer 1 is disposed inside the closed cross section. The front pillar outer 1 serves to reinforce the front pillar 101.

With reference to FIG. 1 to FIG. 4, the front pillar outer 1 includes a glass-face-side flange part 2, a door-side flange part 3, and a main body part 4. The main body part 4 is disposed between the glass-face-side flange part 2 and the door-side flange part 3 in the width direction of the front pillar outer 1. The main body part 4 connects the glass-face-side flange part 2 and the door-side flange part 3 to each other.

The front pillar outer 1 is formed by the first member 11 and the second member 21 that will be described in detail later. The glass-face-side flange part 2 of the front pillar outer 1 is formed by a first glass-face-side flange part 12 of the first member 11 and a second glass-face-side flange part 22 of the second member 21 that partially overlap with each other. The door-side flange part 3 is formed by a first door-side flange part 13 of the first member 11 and a second door-side flange part 23 of the second member 21 that partially overlap with each other. The main body part 4 is formed by a first main body part 14 of the first member 11 and a second main body part 24 of the second member 21 that partially overlap with each other.

In short, in the front pillar outer 1 according to this embodiment, the glass-face-side flange part 2 is a part formed by the first glass-face-side flange part 12 and the second glass-face-side flange part 22. The door-side flange part 3 is a part formed by the first door-side flange part 13 and the second door-side flange part 23. The main body part 4 is a part formed by the first main body part 14 and the second main body part 24.

The glass-face-side flange part 2 of the front pillar outer 1 is joined to the side panel 104 and the front pillar inner 105 by welding or the like. The glass-face-side flange part 2 includes an area that directly or indirectly supports a side edge of the windshield 102. The glass-face-side flange part 2 supports the side edge of the windshield 102 in cooperation with the side panel 104 and the front pillar inner 105.

The door-side flange part 3 is joined to the side panel 104 and the front pillar inner 105 by welding or the like. The door-side flange part 3 includes an area that is directly or indirectly opposed to an upper edge of the door 103. The door-side flange part 3 is opposed to the upper edge of the door 103 along with the side panel 104 and the front pillar inner 105. The cross-sectional shape of the front pillar outer 1 is a hat-like shape.

With reference to FIG. 1 to FIG. 4, the door-side flange part 3 includes the door-side compressive region A1. The door-side compressive region A1 is a partial area of the door-side flange part 3 along the longitudinal direction. A compressive strain is applied to the door-side compressive region A1 when a collision load is applied to the front pillar outer 1. Furthermore, while the vehicle is traveling, a compressive stress and a tensile stress repeatedly occur in the door-side compressive region A1.

The glass-face-side flange part 2 includes the glass-face-side compressive region A2. The glass-face-side compressive region A2 is a partial area of the glass-face-side flange part 2 along the longitudinal direction. A compressive strain is applied to the glass-face-side compressive region A2 when a collision load is applied to the front pillar outer 1.

The glass-face-side flange part 2 further includes a glass-face-side tensile region B. The glass-face-side tensile region B is a partial area of the glass-face-side flange part 2 along the longitudinal direction. A tensile strain is applied to the glass-face-side tensile region B when a collision load is applied to the front pillar outer 1. Furthermore, while the vehicle is traveling, a compressive stress and a tensile stress repeatedly occur in the glass-face-side tensile region B.

The door-side compressive region A1 is disposed closer to the rear end 1re of the front pillar outer 1. The glass-face-side compressive region A2 is disposed closer to the fore end 1*fe* of the front pillar outer 1. The glass-face-side tensile region B is located more rearward than the glass-face-side compressive region A2. The glass-face-side tensile region B is adjacent to the glass-face-side compressive region A2 and extends to a rear end 2*re* of the glass-face-side flange part 2.

Next, the first member 11 and the second member 21 forming the front pillar outer 1 will be described.

[First Member 11]

The first member 11 extends in the longitudinal direction from the fore end 1*fe* toward the rear end 1*re* of the front pillar outer 1. The first member 11 includes the first glass-face-side flange part 12, the first door-side flange part 13, and the first main body part 14. The first glass-face-side flange part 12 forms a part of the glass-face-side flange part 2. The first door-side flange part 13 forms a part of the door-side flange part 3. The first main body part 14 forms a part of the main body part 4, and connects the first glass-face-side flange part 12 and the first door-side flange part 13 to each other.

The first door-side flange part 13 extends in the longitudinal direction from a position corresponding to the fore end 1*fe* of the front pillar outer 1. In the example shown in FIG. 1 and FIG. 4, the first door-side flange part 13 is provided over the whole of a range between a position corresponding to the fore end 1*fe* of the front pillar outer 1 and a position corresponding to the rear end 1*re* of the same. In this case, in the longitudinal direction of the front pillar outer 1, the area of the first door-side flange part 13 agrees with the area of the door-side flange part 3. In the longitudinal direction of the front pillar outer 1, the first door-side flange part 13 includes the door-side compressive region A1.

The first glass-face-side flange part 12 extends in the longitudinal direction from a position corresponding to the fore end 1*fe* of the front pillar outer 1. However, the first glass-face-side flange part 12 does not extend to a position corresponding to the rear end 1*re* of the front pillar outer 1. In other words, the first glass-face-side flange part 12 is provided over a range between a position corresponding to the fore end 1*fe* of the front pillar outer 1 and a position at a predetermined distance from the position corresponding to the fore end 1*fe*. In the longitudinal direction of the front pillar outer 1, the first glass-face-side flange part 12 includes the glass-face-side compressive region A2. However, the first glass-face-side flange part 12 does not include the glass-face-side tensile region B. In this case, the first glass-face-side flange part 12 is not present in a region close to the rear end 2*re* of the glass-face-side flange part 2.

The first main body part 14 is disposed between the first glass-face-side flange part 12 and the first door-side flange part 13 in the lateral direction of the front pillar outer 1. The first main body part 14 extends in the longitudinal direction from a position corresponding to the fore end 1*fe* of the front pillar outer 1. However, as with the first glass-face-side flange part 12, the first main body part 14 does not extend to a position corresponding to the rear end 1*re* of the front pillar outer 1. In other words, the first main body part 14 is provided over a range between a position corresponding to the fore end 1*fe* of the front pillar outer 1 and a position at a predetermined distance from the position corresponding to the fore end 1*fe*. In the longitudinal direction of the front pillar outer 1, the area of the first main body part 14 agrees with the area of the first glass-face-side flange part 12. In this case, the first main body part 14 is not present in a region close to a rear end 4*re* of the main body part 4.

As can be seen from the above description, in the first member 11, a rear end 13*re* of the first door-side flange part 13 is located more rearward than a rear end 12*re* of the first glass-face-side flange part 12 and a rear end 14*re* of the first main body part 14.

[Second Member 21]

The second member 21 extends in the longitudinal direction from the rear end 1*re* toward the fore end 1*fe* of the front pillar outer 1. The second member 21 includes the second glass-face-side flange part 22, the second door-side flange part 23, and the second main body part 24. The second glass-face-side flange part 22 forms a part of the glass-face-side flange part 2. The second door-side flange part 23 forms a part of the door-side flange part 3. The second main body part 24 forms a part of the main body part 4, and connects the second glass-face-side flange part 22 and the second door-side flange part 23 to each other.

The second glass-face-side flange part 22 extends in the longitudinal direction from a position corresponding to the rear end 1*re* of the front pillar outer 1. However, the second glass-face-side flange part 22 does not extend to a position corresponding to the fore end 1*fe* of the front pillar outer 1. In other words, the second glass-face-side flange part 22 is provided over a range between a position corresponding to the rear end 1*re* of the front pillar outer 1 and a position at a predetermined distance from the position corresponding to the rear end 1*re*. In the longitudinal direction of the front pillar outer 1, the second glass-face-side flange part 22 is provided in the glass-face-side tensile region B and the glass-face-side compressive region A2. In this case, the second glass-face-side flange part 22 is not present in a region close to the fore end 2*fe* of the glass-face-side flange part 2.

The second door-side flange part 23 extends in the longitudinal direction from a position corresponding to the rear end 1*re* of the front pillar outer 1. However, the second glass-face-side flange part 22 does not extend to a position corresponding to the fore end 1*fe* of the front pillar outer 1. In other words, the second door-side flange part 23 is provided over a range between a position corresponding to the rear end 1*re* of the front pillar outer 1 and a position at a predetermined distance from the position corresponding to the rear end 1*re*. In the longitudinal direction of the front pillar outer 1, the second door-side flange part 23 is provided in the door-side compressive region A1. In this case, the second door-side flange part 23 is not present in a region close to a fore end 3*fe* of the door-side flange part 3.

The second main body part 24 is disposed between the second glass-face-side flange part 22 and the second door-side flange part 23 in the lateral direction of the front pillar outer 1. The second main body part 24 extends in the longitudinal direction from a position corresponding to the rear end 1*re* of the front pillar outer 1. However, as with the second door-side flange part 23, the second main body part 24 does not extend to a position corresponding to the fore end 1*fe* of the front pillar outer 1. In other words, the second main body part 24 is provided over a range between a position corresponding to the rear end 1*re* of the front pillar outer 1 and a position at a predetermined distance from the position corresponding to the rear end 1*re*. In the longitudinal direction of the front pillar outer 1, the area of the second main body part 24 agrees with the area of the second door-side flange part 23. In this case, the second main body part 24 is not present in a region close to a fore end 4*fe* of the main body part 4.

As can be seen from the above description, in the second member 21, a fore end 22*fe* of the second glass-face-side flange part 22 is located more forward than a fore end 23*fe* of the second door-side flange part 23 and a fore end 24fe of the second main body part 24.

[Front Pillar Outer 1 Formed by First Member 11 and Second Member 21]

The first door-side flange part 13 and the second door-side flange part 23 overlap with each other in the area from the rear end 13re of the first door-side flange part 13 to the fore end 23fe of the second door-side flange part 23. In other words, the first door-side flange part 13 and the second door-side flange part 23 overlap with each other in the area of the door-side compressive region A1. In this overlapping area, the first door-side flange part 13 and the second door-side flange part 23 are joined to each other by welding.

The first glass-face-side flange part 12 and the second glass-face-side flange part 22 overlap with each other in the area from the rear end 12re of the first glass-face-side flange part 12 to the fore end 22fe of the second glass-face-side flange part 22. In other words, the first glass-face-side flange part 12 and the second glass-face-side flange part 22 overlap with each other in the area of the glass-face-side compressive region A2. In this overlapping area, the first glass-face-side flange part 12 and the second glass-face-side flange part 22 are joined to each other by welding.

Furthermore, the first main body part 14 and the second main body part 24 overlap with each other in an area from the rear end 14re of the first main body part 14 to the fore end 24fe of the second main body part 24. In this overlapping area, the first main body part 14 and the second main body part 24 are joined to each other by welding.

As described above, with the front pillar outer 1 according to this embodiment, the first member 11 and the second member 21 are joined to each other and thereby integrated with each other in the area in which the members overlap with each other. The front pillar outer 1 is formed in this way.

In the whole range of the door-side compressive region A1, two layers of material, that is, the first door-side flange part 13 and the second door-side flange part 23 joined to each other, are stacked on one another. As a result, the thickness of the door-side compressive region A1 is substantially increased over the whole range thereof. Therefore, the buckling strength of the door-side compressive region A1 is significantly improved. In this way, the strength of the front pillar outer 1 can be increased.

In the example shown in FIG. 1 to FIG. 4, the first member 11 is arranged below the second member 21. An overlapping area O1 in which the first door-side flange part 13 and the second door-side flange part 23 overlap with each other agrees with the range of the door-side compressive region A1. In this specification, the overlapping area O1 is referred to also as a "door-side overlapping area". Provided that the length of the glass-face-side flange part 2 is denoted by L, the range of the door-side compressive region A1 is a range on the door-side flange part 3 between a position corresponding to the rear end 2re of the glass-face-side flange part 2 and a position at a distance of L×2/3 from the position corresponding to the rear end 2re of the glass-face-side flange part 2. Therefore, the door-side overlapping area O1 is provided over the whole range of the door-side compressive region A1. However, the door-side overlapping area O1 may be provided over a part of the range of the door-side compressive region A1. For example, the compressive strain may be small in an area close to the rear end 3re of the door-side flange part 3. In this case, the first member 11 needs not be present in the area close to the rear end 3re of the door-side flange part 3.

In the glass-face-side compressive region A2, two layers of material, that is, the first glass-face-side flange part 12 and the second glass-face-side flange part 22 joined to each other, are stacked on one another. As a result, the plate thickness of the glass-face-side compressive region A2 is substantially increased over the whole range thereof. Therefore, the buckling strength of the glass-face-side compressive region A2 is significantly improved. In this way, the strength of the front pillar outer 1 can be increased.

In the example shown in FIG. 1 to FIG. 4, the first member 11 is arranged below the second member 21. An overlapping area O2 in which the first glass-face-side flange part 12 and the second glass-face-side flange part 22 overlap with each other agrees with the range of the glass-face-side compressive region A2. In this specification, the overlapping area O2 is referred to also as a "glass-face-side overlapping area". Provided that the length of the glass-face-side flange part 2 is denoted by L, the range of the glass-face-side compressive region A2 is a range between a position at a distance of L×1/8 from the fore end 2fe of the glass-face-side flange part 2 and a position at a distance of L×2/3 from the fore end 2fe of the glass-face-side flange part 2. Therefore, the glass-face-side overlapping area O2 is provided over the whole range of the glass-face-side compressive region A2. However, the glass-face-side overlapping area O2 may be provided over a part of the range of the glass-face-side compressive region A2.

The first member 11 is not present in the glass-face-side tensile region B. In other words, the glass-face-side tensile region B is formed by only the second member 21. Therefore, an increase of the weight can be reduced, and the weight of the front pillar outer 1 can be reduced by increasing the strength of the material. In addition, the plate thickness of the second member 21 is equal to or greater than the plate thickness of the first member 11. Therefore, the rigidity of the glass-face-side tensile region B is improved. As a result, the traveling stability is improved.

[Deformation Behavior of Front Pillar Outer 1 in Collision and Relationship Between Compressive Strain Region and Tensile Strain Region]

As described above, in the door-side overlapping area O1 that corresponds to the door-side compressive region A1, two layers of material are stacked on one another. In the glass-face-side overlapping area O2 that corresponds to the glass-face-side compressive region A2, two layers of material are also stacked on one another. On the other hand, the glass-face-side tensile region B is made of a single material. Therefore, the plate thickness of a compressive strain region (the door-side compressive region A1 and the glass-face-side compressive region A2) is substantially greater than a tensile strain region (the glass-face-side tensile region B) and the other areas. Therefore, the collision resistance of the compressive strain region is higher than that of the tensile strain region and the other areas.

Figure 5:
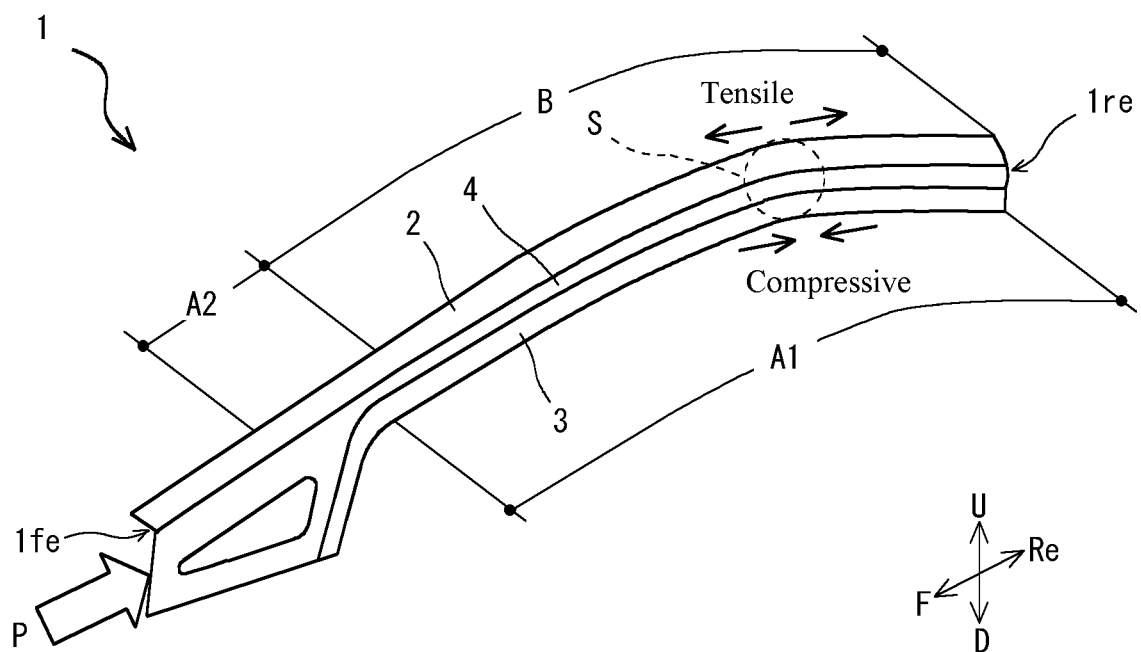
FIG. 5 is a perspective view of the front pillar outer on which a collision load is applied.

FIG. 5 is a perspective view of the front pillar outer 1 on which a collision load is applied. With reference to FIG. 5, in a state where the front pillar outer 1 is installed on an automobile, the fore end 1fe of the front pillar outer 1 is located at a lower position than the rear end 1re. In the case of a head-on collision of the automobile, a collision load P is applied to the fore end 1fe of the front pillar outer 1. The front pillar outer 1 has a curved shape, and is convex upward between the fore end 1fe and the rear end 1re. When the collision load P is applied to the front pillar outer 1, the stress is concentrated in the curved part of the front pillar outer 1, and the curved part is to be bent upward. As a result, a compressive stress occurs in the door-side flange part 3, and a compressive strain is exerted on the door-side flange part 3. On the other hand, a tensile stress occurs in the glass-face-side flange part 2, and a tensile strain is exerted on the glass-face-side flange part 2. The compressive stress occurring in the door-side flange part 3 and the tensile stress occurring in the glass-face-side flange part 2 exert a compressive strain on the glass-face-side flange part 2.

If the compressive strain excessively increases, the front pillar outer 1 buckles and is bent upward. If the front pillar outer 1 buckles, the collision energy absorption capacity of the front pillar outer 1 markedly decreases. Therefore, in order to increase the collision resistance of the front pillar outer 1, buckling of the front pillar outer 1 needs to be prevented.

To prevent buckling of the front pillar outer 1, it is effective to increase the collision resistance of the area of the door-side flange part 3 on which the compressive strain is exerted, that is, the door-side compressive region A1. Increasing the collision resistance of the area of the glass-face-side flange part 2 on which the compressive strain is exerted, that is, the glass-face-side compressive region A2, also contributes to the prevention of buckling of the front pillar outer 1.

With the front pillar outer 1, in an area S shown in FIG. 1, FIG. 2, and FIG. 5, the curvature of the door-side flange part 3 is large. The compressive strain is exerted on this area S. This area is the door-side compressive region A1. The compressive strain is also exerted on a part of the glass-face-side flange part 2. This area is the glass-face-side compressive region A2.

In the glass-face-side flange part 2, the tensile strain is exerted on an area at the rear of the glass-face-side compressive region A2. This area is the glass-face-side tensile region B.

The collision resistance (buckling strength) of the front pillar outer 1 largely depends on the plate thickness of the material of the compressive strain region. The plate thickness of the material in the tensile strain region has a smaller effect on the collision resistance of the front pillar outer 1 than the plate thickness of the material in the compressive strain region. Therefore, the plate thickness of the material in the glass-face-side tensile region B can be smaller than the effective plate thickness of the material in the door-side compressive region A1 and the glass-face-side compressive region A2.

Figure 6:
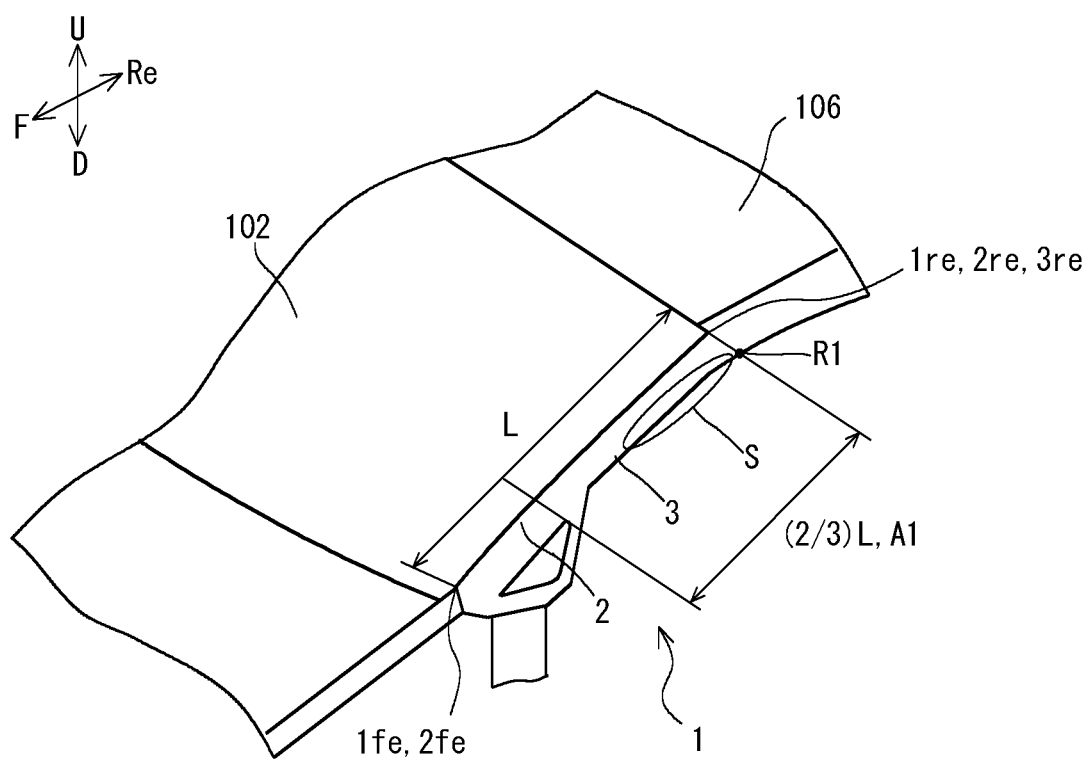
FIG. 6 is a schematic diagram showing a part of a vehicle body structure including the front pillar outer.

FIG. 6 is a schematic diagram showing a part of a vehicle body structure including the front pillar outer 1. In FIG. 6, illustration of the side panel of the front pillar is omitted. With reference to FIG. 6, the rear end of the front pillar is joined to a roof 106 of the vehicle. The roof 106 is provided to be approximately horizontal with respect to the ground. On the other hand, the windshield 102 of the vehicle is disposed to be inclined with respect to the ground. Therefore, the front pillar is curved in a part that is close to the rear end thereof. Accordingly, the front pillar outer 1 is also curved in a part that is close to the rear end 1$re$ thereof.

When a collision load is applied to the front pillar outer 1, a large compressive strain is likely to occur in the door-side flange part 3 in the curved area S close to the rear end 1$re$ of the front pillar outer 1. The shape of the front pillar outer 1 varies with the model. Therefore, the part in which a large compressive strain occurs varies with the model. In many cases, however, the area on which a compressive strain is exerted can be determined in a certain range. Specifically, as shown in FIG. 6, in the door-side flange part 3, a compressive strain is exerted in the range between a position R1 corresponding to the rear end 2$re$ of the glass-face-side flange part 2 and a position at a distance of L×2/3 from the position R1 corresponding to the rear end 2$re$ of the glass-face-side flange part 2. In short, this range is the range of the door-side compressive region A1. Here, L means the arc length (length in the longitudinal direction) of the glass-face-side flange part 2 of the front pillar outer 1 along the door-side edge thereof. The position R1 corresponds to the rear end 3$re$ of the door-side flange part 3.

Therefore, as shown in FIG. 1, the door-side overlapping area O1 is provided over at least a part of the range of the door-side flange part 3 between the position R1 corresponding to the rear end 2$re$ of the glass-face-side flange part 2 and the position at a distance of L×2/3 from the position R1 corresponding to the rear end 2$re$ of the glass-face-side flange part 2. In other words, the door-side overlapping area O1 is provided over a part or the whole of the range of the door-side compressive region A1. FIG. 1 shows an example in which the door-side overlapping area O1 is provided over the whole range of the door-side compressive region A1.

[Deformation Behavior of Front Pillar Outer 1 During Traveling of Vehicle]

Figure 7:
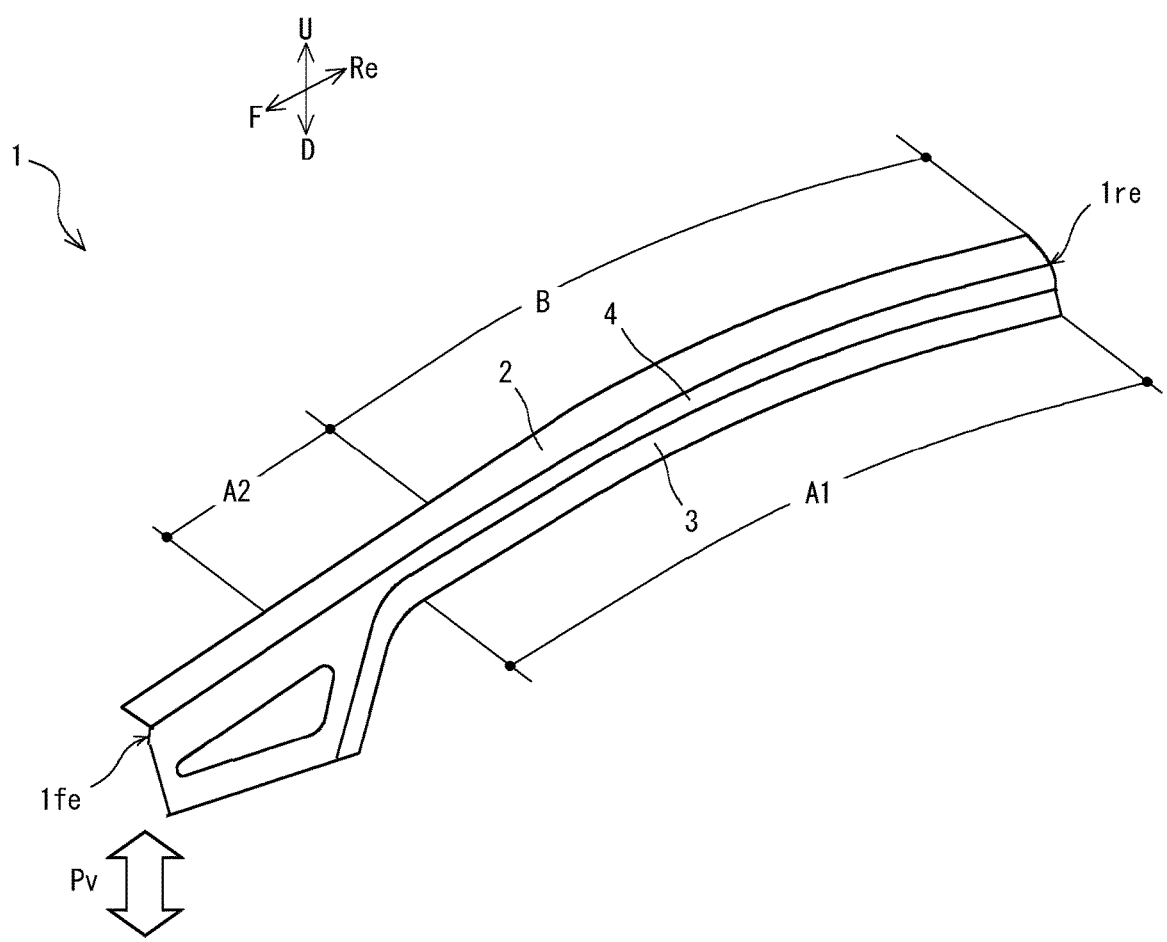
FIG. 7 is a perspective view of the front pillar outer during traveling of the vehicle.

FIG. 7 is a perspective view of the front pillar outer 1 during traveling of the vehicle. While the automobile is traveling, a vertical load Pv is repeatedly applied from the front wheels to the front pillar outer 1 through the suspension or the like. The repetitive load Pv is applied to the fore end 1$fe$ of the front pillar outer 1. As a result, the front pillar outer 1 is warped in the vertical direction with the rear end 1$re$ thereof fixed as a fulcrum. Therefore, a compressive stress and a tensile stress repeatedly occur in the glass-face-side tensile region B of the front pillar outer 1.

If the rigidity of the glass-face-side tensile region B in which the repetitive stress occurs is low, the front pillar outer 1 is significantly warped in the vertical direction during traveling of the vehicle. This compromises the traveling stability. Therefore, the rigidity of the glass-face-side tensile region B needs to be increased. In order to increase the rigidity of the glass-face-side tensile region B, it is effective to increase the plate thickness of the material forming the glass-face-side tensile region B, that is, the second member 21.

Figure 8:
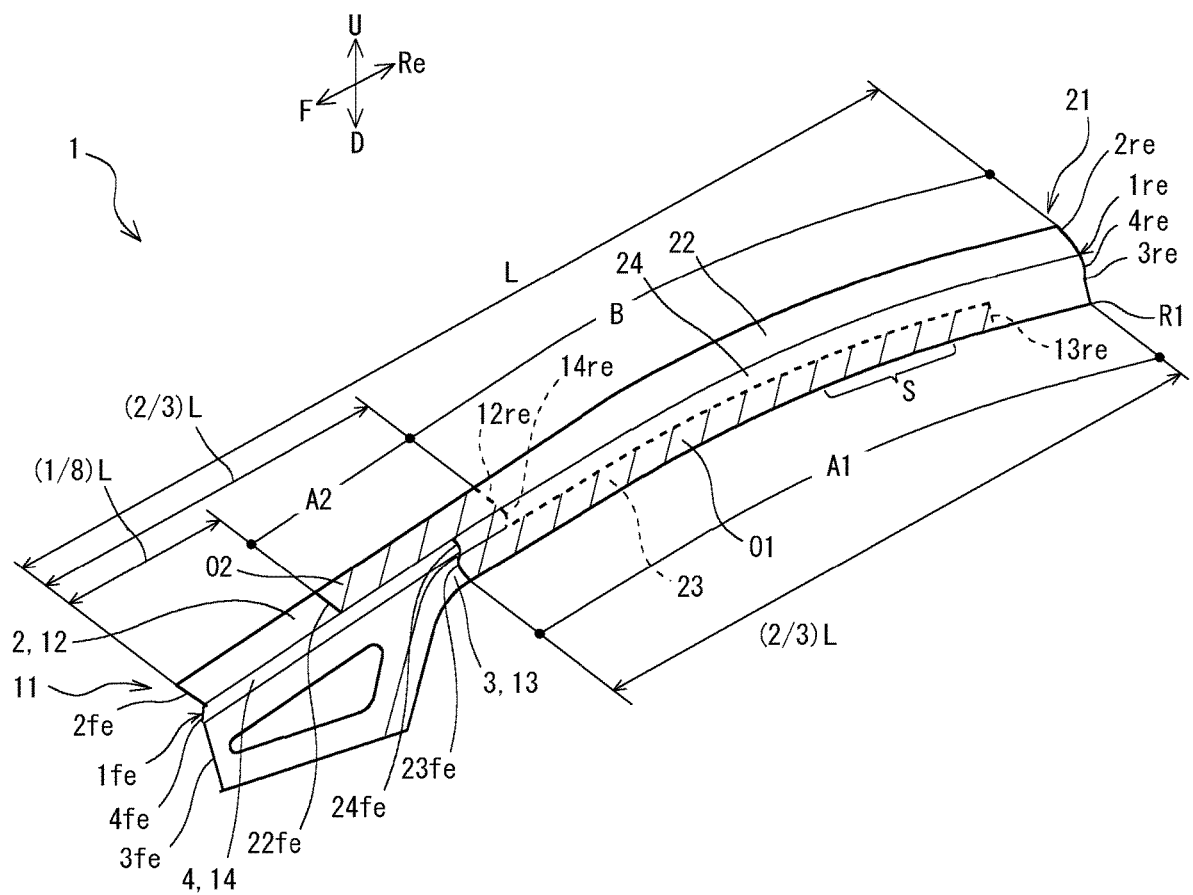
FIG. 8 is a perspective view of another example of the front pillar outer according to the embodiment.

FIG. 8 is a perspective view of another example of the front pillar outer 1 according to this embodiment. With the front pillar outer 1 shown in FIG. 8, the compressive strain exerted in a collision is small in the area close to the rear end 3$re$ of the door-side flange part 3. In this case, the first member 11 (the first door-side flange part 13) is not present in the area close to the rear end 3$re$ of the door-side flange part 3. Therefore, the first door-side flange part 13 is not present in a part close to the rear end 3$re$ of the door-side flange part 3. In other words, FIG. 8 shows an example in which the door-side overlapping area O1 is provided over a part of the door-side compressive region A1. In this case, the rear end 13$re$ of the first door-side flange part 13 is located more forward than the rear end 1$re$ of the front pillar outer 1.

With reference to FIG. 1, when a collision load is applied to the front pillar outer 1, a large compressive strain is likely to occur in the glass-face-side flange part 2 close to the fore end 1$fe$ of the front pillar outer 1. The compressive strain is caused by a compressive stress occurring in the door-side flange part 3 and a tensile stress occurring in the glass-face-side flange part 2. In many cases, the area on which the compressive strain is exerted can be determined in a certain range. Specifically, as shown in FIG. 1, in the glass-face-side flange part 2, the compressive strain is exerted in the range between a position at a distance of L×1/8 from the fore end 2*fe* of the glass-face-side flange part 2 and a position at a distance of L×2/3 from the fore end 2*fe* of the glass-face-side flange part 2. In short, this range is the glass-face-side compressive region A2. Here, L means the arc length (length in the longitudinal direction) of the glass-face-side flange part 2 of the front pillar outer 1 along the door-side edge thereof.

Therefore, as shown in FIG. 1, the glass-face-side overlapping area O2 is provided over at least a part of the range of the glass-face-side flange part 2 between the position at a distance of L×1/8 from the fore end 2*fe* of the glass-face-side flange part 2 and the position at a distance of L×2/3 from the fore end 2*fe* of the glass-face-side flange part 2. In other words, the glass-face-side overlapping area O2 is provided over a part or the whole of the range of the glass-face-side compressive region A2. FIG. 1 shows an example in which the glass-face-side overlapping area O2 is provided over the whole range of the glass-face-side compressive region A2.

[Plate Thickness]

With the front pillar outer 1, practically, the plate thickness of the first member 11 and the second member 21 is preferably 0.60 mm or more to 1.60 mm or less. When the plate thickness is 0.60 mm or more, a sufficient strength of the compressive strain region in which two layers of material are stacked on one another can be ensured. The same holds true for the tensile strain region and the other areas that are formed by a single layer of a single material (the first member 11 or the second member 21). However, it is necessary that the plate thickness of the second member 21 is not smaller than the plate thickness of the first member 11, in order to ensure the rigidity of the glass-face-side tensile region B. On the other hand, when the plate thickness is 1.60 mm or less, an increase of the weight can be reduced.

From the viewpoint of ensuring sufficient strength and rigidity, the lower limit of the plate thickness is more preferably 0.85 mm. On the other hand, from the viewpoint of further reducing the increase of the weight, the upper limit of the plate thickness is 1.05 mm.

[Tensile Strength]

With the front pillar outer 1, the tensile strength (the strength of the material) of the first member 11 and the second member 21 is preferably 800 MPa or more. When the tensile strength is 800 MPa or more, the strength of the compressive strain region in which two layers of material are stacked on one another can be sufficiently improved. The same holds true for the tensile strain region and the other areas that are formed by a single layer of a single material (the first member 11 or the second member 21). The lower limit of the tensile strength is more preferably 1200 MPa, and even more preferably 1500 MPa. The tensile strength of the first member 11 may be the same as or different from the tensile strength of the second member 21. In order to ensure the strength and rigidity of the glass-face-side tensile region B formed by only the second member 21, the tensile strength of the second member 21 is preferably higher than the tensile strength of the first member 11.

[Joining]

In the door-side overlapping area O1 corresponding to the door-side compressive region A1, the first door-side flange part 13 and the second door-side flange part 23 are joined to each other. Similarly, in the glass-face-side overlapping area O2 corresponding to the glass-face-side compressive region A2, the first glass-face-side flange part 12 and the second glass-face-side flange part 22 are joined to each other. The joining method is welding, for example. The welding method may be laser welding or spot welding, for example. The joining method may be mechanical fastening or bonding using an adhesive, for example. Some of these joining methods can also be used in combination. Of these joining methods, laser welding or spot welding are preferably used, since the productivity is high.

EXAMPLE 1

To check the effectiveness of the front pillar outer according to this embodiment, computer aided engineering (CAE) analysis was performed. To evaluate the collision resistance, a collision test was simulated by CAE analysis. Furthermore, to evaluate the rigidity, driving test was simulated by CAE analysis. As models of Invention Examples 1 to 3, the front pillar outer 1 shown in FIG. 1 was fabricated. The models of Invention Examples 1 to 3 differ in plate thickness of the first member. As a model of Comparative Example, a front pillar outer formed from a single plate material was fabricated. A fixed tensile strength of 1500 (MPa) was used for all the models.

[Analysis Conditions]

Figure 9:
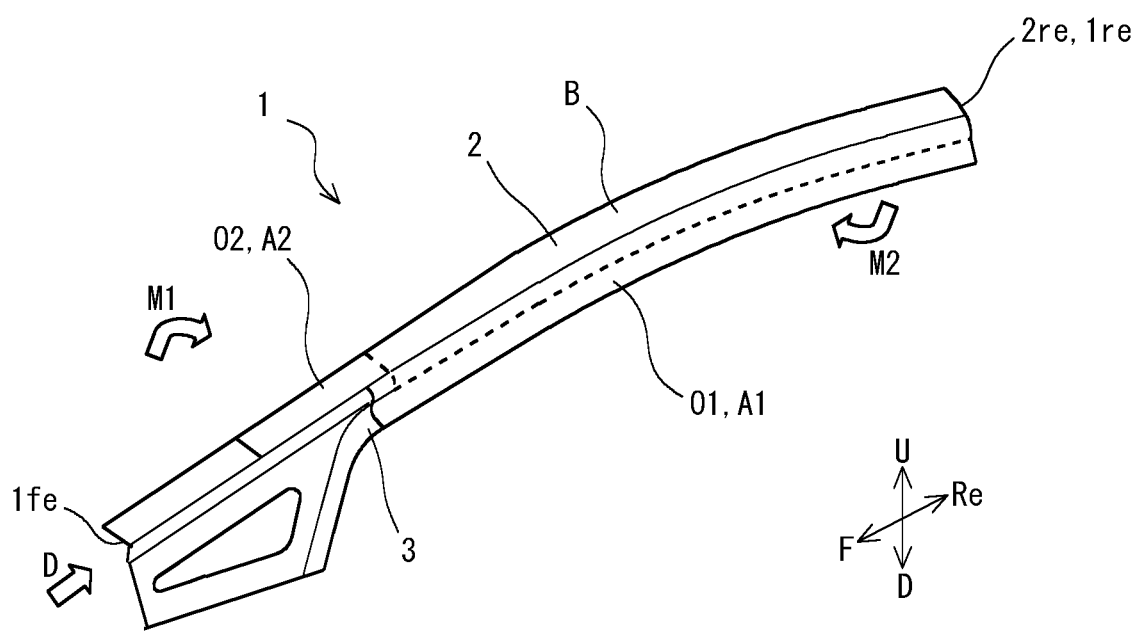
FIG. 9 is a schematic diagram for illustrating analysis conditions in Examples.
Figure 10:
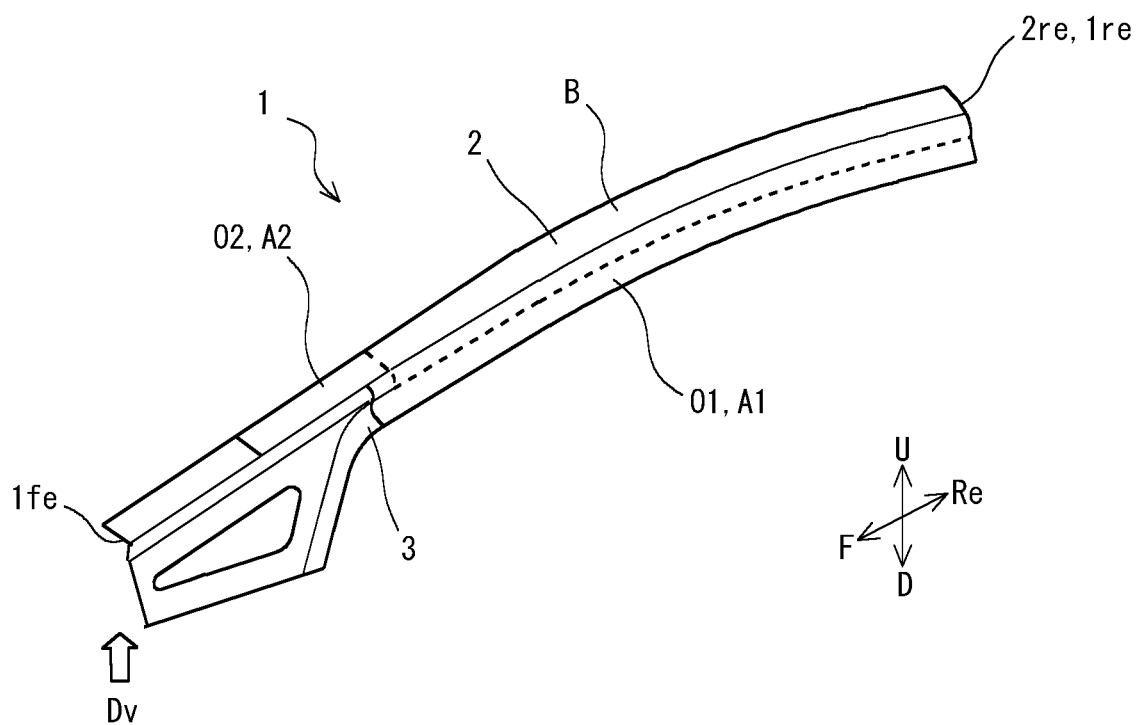
FIG. 10 is a schematic diagram for illustrating analysis conditions in Examples.

FIG. 9 and FIG. 10 are schematic diagrams for illustrating analysis conditions in Examples. FIG. 9 shows analysis conditions of a collision test simulation. FIG. 10 shows analysis conditions of a driving test simulation.

With reference to FIG. 9, in the analysis in the collision test, a displacement D in the longitudinal direction of the front pillar outer 1 was exerted on the fore end 1*fe* of the front pillar outer 1. On the other hand, the rear end 2*re* of the glass-face-side flange part 2 was fixed.

The displacement D caused bending moment M1 in the vicinity of the fore end 1*fe* of the front pillar outer 1. The direction of the bending moment M1 was clockwise when viewed from the left of the vehicle. It was assumed that the displacement D was positive when the displacement D was in the direction from the fore end 1*fe* to the rear end 1*re* of the front pillar outer 1. The displacement D caused a bending moment M2 in the rear end 2*re* of the glass-face-side flange part 2. The direction of the bending moment M2 was clockwise, as with the bending moment M1, when viewed from the left of the vehicle.

With reference to FIG. 10, in the analysis in the driving test, a displacement Dv was exerted in the upward direction on the fore end 1*fe* of the front pillar outer 1. On the other hand, the rear end 2*re* of the glass-face-side flange part 2 was fixed. The displacement Dv caused the front pillar outer 1 to be warped upward with the rear end 1*re* thereof fixed as a fulcrum.

[Evaluation Method]

In the analysis in the collision test, for each model, the load at the time when buckling occurred because of the exertion of the displacement D, that is, the maximum load, was investigated. Furthermore, the increase in percentage of the maximum load for each model was calculated with respect to the maximum load for the model of Comparative Example. In the analysis in the driving test, for each model, the load at the time when a displacement Dv of 1.0 mm was exerted, that is, the withstand load, was investigated. Furthermore, the increase in percentage of the withstand load for each model was calculated with respect to the withstand load for the model of Comparative Example. The models were evaluated by comparison of the increase ratio of the maximum load and the increase ratio of the withstand load.

[Results]
Table 1 below shows the results.

TABLE 1

| Example | Plate Thickness of First Member (mm) | Plate Thickness of Second Member (mm) | Increase Ratio of Maximum Load (%) | Increase Ratio of Withstand Load (%) |
| --- | --- | --- | --- | --- |
| Comparative Example | 1.25 | — | 0 (Reference) | 0 (Reference) |
| Invention Example 1 | 0.85 | 1.25 | 13.6 | 10 |
| Invention Example 2 | 0.95 | 1.25 | 17.2 | 22 |
| Invention Example 3 | 1.05 | 1.25 | 20.9 | 28 |

The results in Table 1 show the following conclusions. The increase ratio of the maximum load was more than 0 for all Invention Examples 1 to 3. In other words, the front pillar outers of Invention Examples 1 to 3 were improved in collision resistance (buckling strength) over the front pillar outer of Comparative Example. The increase ratio of the withstand load was more than 0 for all Invention Examples 1 to 3. In other words, the front pillar outers of Invention Examples 1 to 3 were improved in rigidity over the front pillar outer of Comparative Example.

EXAMPLE 2

As in Example 1, CAE analysis was performed. In the models of Invention Examples 11 to 19 in the example 2, the first members had the same plate thickness of 1.05 mm, the second members had the same plate thickness of 1.25 mm, and the door-side overlapping area O1 and the glass-face-side overlapping area O2 were provided over different ranges. As a model of Comparative Example in Example 2, the model of Comparative Example in Example 1 (plate thickness: 1.25 mm) was used. Table 2 below shows conditions for the models that are different from those in Example 1. The other conditions were the same as those in Example 1.

TABLE 2

| Example | Door-side overlapping area | Glass-face-side overlapping area | Increase Ratio of Maximum Load (%) | Increase Ratio of Withstand Load (%) |
| --- | --- | --- | --- | --- |
| Comparative Example | Not Provided | Not Provided | 0 (Reference) | 0 (Reference) |
| Invention Example 11 | Part of Forward Area of A1 | Part of Forward Area of A2 | 10.3 | 15 |
| Invention Example 12 | Part of A1 | Part of Forward Area of A2 | 12.4 | 19 |
| Invention Example 13 | Whole of A1 | Part of Forward Area of A2 | 14.6 | 23 |
| Invention Example 14 | Part of Forward Area of A1 | Part of A2 | 13.1 | 20 |
| Invention Example 15 | Part of Forward Area of A1 | Whole of A2 | 15.2 | 24 |
| Invention Example 16 | Part of A1 | Part of A2 | 17.3 | 25 |
| Invention Example 17 | Part of A1 | Whole of A2 | 19.7 | 27 |
| Invention Example 18 | Whole of A1 | Part of A2 | 19.8 | 27 |
| Invention Example 19 | Whole of A1 | Whole of A2 | 20.9 | 28 |

The results in Table 2 show the following conclusions. The increase ratio of the maximum load was more than 0 for all Invention Examples 11 to 19. In other words, the front pillar outers of Invention Examples 11 to 19 were improved in collision resistance (buckling strength) over the front pillar outer of Comparative Example. The increase ratio of the withstand load was more than 0 for all Invention Examples 11 to 19. In other words, the front pillar outers of Invention Examples 11 to 19 were improved in rigidity over the front pillar outer of Comparative Example.

The results of the examples 1 and 2 prove that the front pillar outer according to this embodiment is improved in strength and rigidity. In particular, the result of Example 2 proves that the reduction in weight and the improvement in strength can be more effectively achieved if the door-side overlapping area O1 is provided over a part or the whole of the door-side compressive region A1, and the glass-face-side overlapping area O2 is provided over a part or the whole of the glass-face-side compressive region A2.

An embodiment of the present invention has been described above. However, the embodiment described above is just an example of the mode for carrying out the present invention. Therefore, the present invention is not limited to the embodiment described above, and modifications can be made to the embodiment described above as required without departing from the spirit of the present invention.

REFERENCE SIGNS LIST 1 front pillar outer
1*fe* fore end of front pillar outer
1*re* rear end of front pillar outer
2 glass-face-side flange part
2*fe* fore end of glass-face-side flange part
2*re* rear end of glass-face-side flange part
3 door-side flange part
3*fe* fore end of door-side flange part
3*re* rear end of door-side flange part
4 main body part
4*fe* fore end of main body part
4*re* rear end of main body part
11 first member
12 first glass-face-side flange part
12*re* rear end of first glass-face-side flange part
13 first door-side flange part
13*re* rear end of first door-side flange part
14 first main body part
14*re* rear end of first main body part
21 second member
22 second glass-face-side flange part
22*fe* fore end of second glass-face-side flange part
23 second door-side flange part
23*fe* fore end of second door-side flange part
24 second main body part
24*fe* fore end of second main body part
A1 door-side compressive region A2 glass-face-side compressive region
B glass-face-side tensile region
O1 door-side overlapping area
O2 glass-face-side overlapping area
101 front pillar
102 windshield
103 door
104 side panel
105 front pillar inner
106 roof

The invention claimed is:

1. A front pillar outer including a glass-face-side flange part, a door-side flange part, and a main body part that connects the glass-face-side flange part and the door-side flange part to each other,
wherein the front pillar outer comprises:
a first member that extends in a longitudinal direction from a fore end toward a rear end of the front pillar outer and includes a first glass-face-side flange part that forms a part of the glass-face-side flange part, a first door-side flange part that forms a part of the door-side flange part, and a first main body part that forms a part of the main body part and connects the first glass-face-side flange part and the first door-side flange part to each other; and
a second member that extends in the longitudinal direction from the rear end toward the fore end of the front pillar outer and includes a second glass-face-side flange part that forms a part of the glass-face-side flange part, a second door-side flange part that forms a part of the door-side flange part, and a second main body part that forms a part of the main body part and connects the second glass-face-side flange part and the second door-side flange part to each other,
a plate thickness of the second member is equal to or greater than a plate thickness of the first member,
a rear end of the first door-side flange part is located more rearward than a rear end of the first glass-face-side flange part and a rear end of the first main body part,
a fore end of the second glass-face-side flange part is located more forward than a fore end of the second door-side flange part and a fore end of the second main body part,
the first door-side flange part and the second door-side flange part overlap with each other in an area from the rear end of the first door-side flange part to the fore end of the second door-side flange part,
the first glass-face-side flange part and the second glass-face-side flange part overlap with each other in an area from the rear end of the first glass-face-side flange part to the fore end of the second glass-face-side flange part,
the first main body part and the second main body part overlap with each other in an area from the rear end of the first main body part to the fore end of the second main body part, and
the first member and the second member are joined to each other in the area in which the first door-side flange part and the second door-side flange part overlap with each other, the area in which the first glass-face-side flange part and the second glass-face-side flange part overlap with each other, and the area in which the first main body part and the second main body part overlap with each other.

2. The front pillar outer according to claim 1, wherein provided that a length of the glass-face-side flange part is denoted by L,
the area in which the first door-side flange part and the second door-side flange part overlap with each other is provided in the door-side flange part over a part of a range between a position corresponding to a rear end of the glass-face-side flange part and a position at a distance of L×2/3 from the position corresponding to the rear end of the glass-face-side flange part.

3. The front pillar outer according to claim 1, wherein provided that a length of the glass-face-side flange part is denoted by L,
the area in which the first door-side flange part and the second door-side flange part overlap with each other is provided in the door-side flange part over the whole of a range between a position corresponding to a rear end of the glass-face-side flange part and a position at a distance of L×2/3 from the position corresponding to the rear end of the glass-face-side flange part.

4. The front pillar outer according to claim 1, wherein provided that a length of the glass-face-side flange part is denoted by L,
the area in which the first glass-face-side flange part and the second glass-face-side flange part overlap with each other is provided over a part of a range between a position at a distance of L×1/8 from a fore end of the glass-face-side flange part and a position at a distance of L×2/3 from the fore end of the glass-face-side flange part.

5. The front pillar outer according to claim 1, wherein provided that a length of the glass-face-side flange part is denoted by L,
the area in which the first glass-face-side flange part and the second glass-face-side flange part overlap with each other is provided over the whole of a range between a position at a distance of L×1/8 from a fore end of the glass-face-side flange part and a position at a distance of L×2/3 from the fore end of the glass-face-side flange part.

* * * * *